United States Patent [19]
Piotrowski et al.

[11] Patent Number: 5,660,204
[45] Date of Patent: Aug. 26, 1997

[54] TANK BLANKETING VALVE

[75] Inventors: Thomas C. Piotrowski, West Chicago, Ill.; William Zehr, Sarasota, Fla.; Scott R. Diaz, Chicago, Ill.

[73] Assignee: The Protectoseal Company, Bensenville, Ill.

[21] Appl. No.: 517,242

[22] Filed: Aug. 21, 1995

[51] Int. Cl.[6] .................................................. F16K 17/10
[52] U.S. Cl. ............................ 137/492.5; 137/454.5; 137/625.27; 137/625.33; 137/625.66; 137/907
[58] Field of Search ................................. 137/454.5, 488, 137/489, 489.3, 489.5, 492.5, 625.33, 625.66, 625.25, 625.27

[56] References Cited

U.S. PATENT DOCUMENTS

| | | | |
|---|---|---|---|
| 2,342,763 | 2/1944 | Smith . | |
| 3,028,878 | 4/1962 | Natho | 137/556 |
| 3,977,438 | 8/1976 | Muchow et al. | 137/625.27 X |
| 4,172,466 | 10/1979 | Pattarini et al. | 137/489 |
| 4,609,008 | 9/1986 | Anderson, Jr et al. | 137/488 |
| 4,802,505 | 2/1989 | Gemignani et al. | 137/492 |
| 4,972,870 | 11/1990 | Changnian et al. | 137/492.5 X |
| 4,991,620 | 2/1991 | Ligh | 137/489 |
| 5,067,522 | 11/1991 | Ligh | 137/489 |
| 5,072,749 | 12/1991 | Ligh | 137/116.5 |
| 5,094,267 | 3/1992 | Ligh | 137/488 |

*Primary Examiner*—S. Hepperle
*Attorney, Agent, or Firm*—Olson & Hierl, Ltd.

[57] ABSTRACT

An improved valve is provided for blanketing and maintaining the vapor space of a tank with inert gas at a set pressure. The valve is of the type that incorporates a pilot valve that operates in response to sensed tank vapor space gas pressure. The opening and closing of the pilot valve controls the opening and closing of an associated main valve which admits pressurized inert gas into the tank from an inert gas supply to maintain the tank set pressure. The valve permits one to externally adjust internal components of the pilot valve after valve assembly. Also, the valve provides for pressure balanced operation that achieves a consistent opening pressure over the allowable range of inlet gas supply pressures.

10 Claims, 5 Drawing Sheets

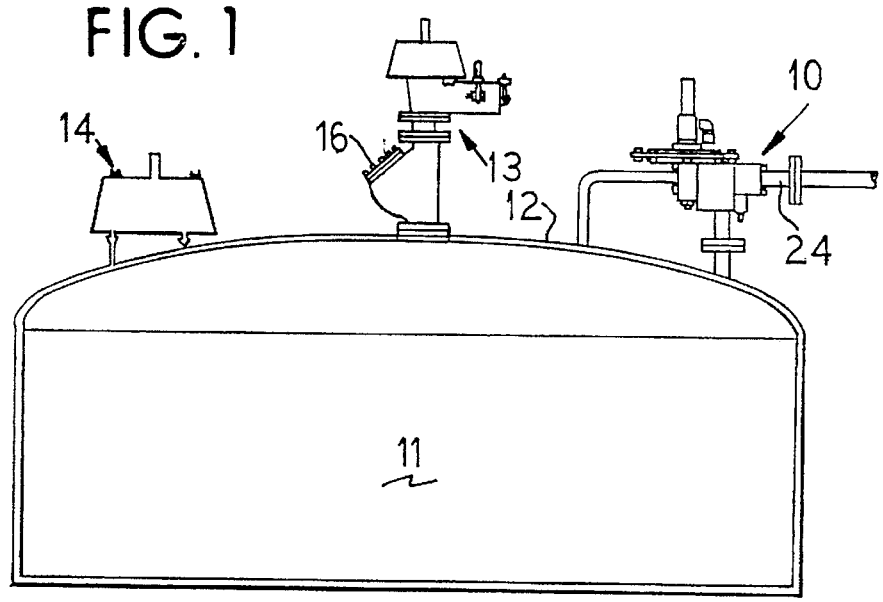
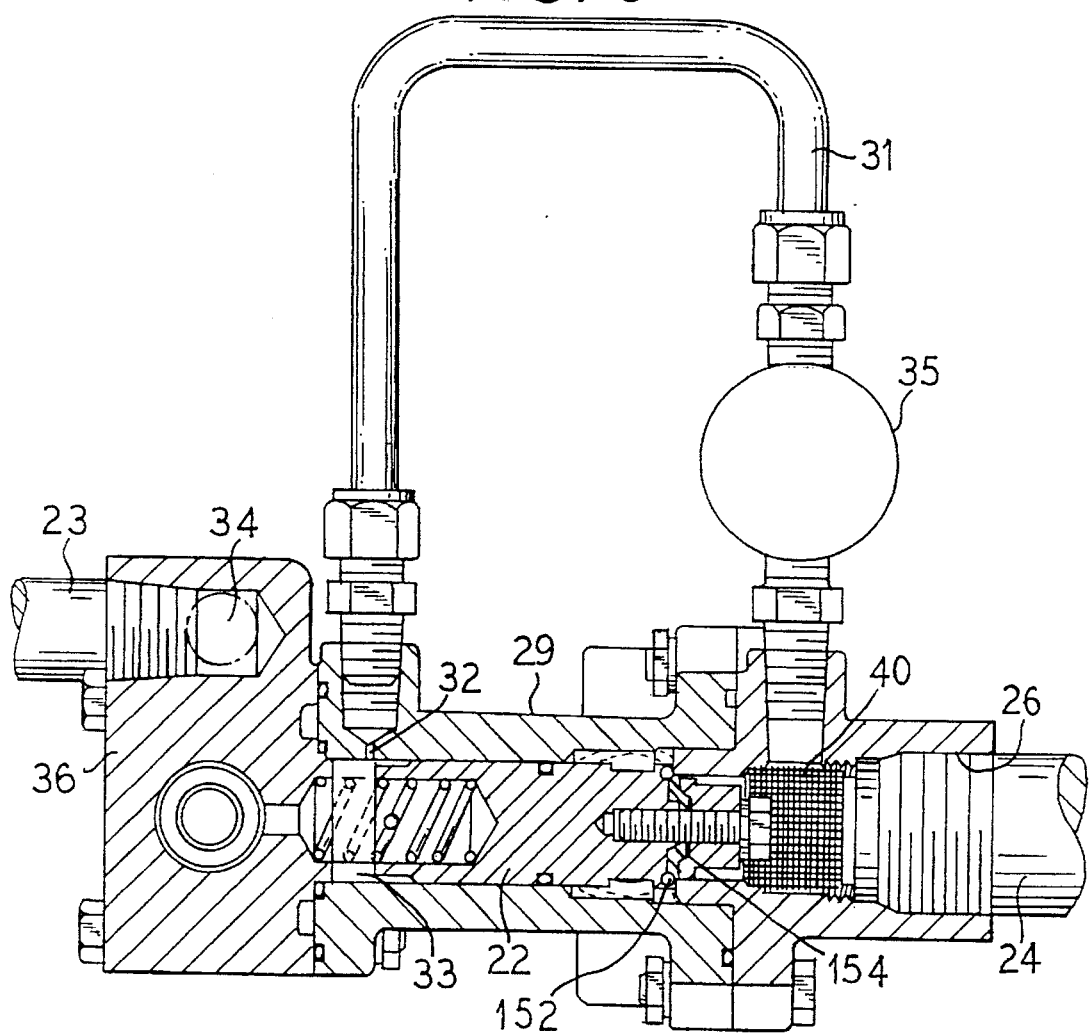

TANK BLANKETING VALVE

FIELD OF THE INVENTION

This invention relates to tank blanketing valves which sense gas pressure in the vapor space of a tank and which maintain the gas pressure within the tank at or above a set point by the addition of an inert gas, as needed.

BACKGROUND OF THE INVENTION

Maintenance of an inert (or protective) gas in the vapor space over a flammable liquid held in a storage tank prevents atmospheric air from entering the tank. This minimizes liquid evaporation and environmental emissions, reduces fire and explosion risks, and also prevents a buildup of vacuum (subatmospheric pressures) in tank vapor space that is in excess of the tank's design capacity. To achieve such maintenance, tank blanketing valve assemblies that incorporate vapor space gas pressure sensing and regulating means have come into widespread use. Such a valve assembly is functionally associated with a top portion of a storage tank along with an independently functioning emergency pressure vent and an independently functioning conservation vent. The latter vent may be in association with a flame arrestor.

Tank blanketing valve assemblies often incorporate a main valve and a cooperating pilot valve operating in tandem. In such an assembly, a sensed pressure change in the tank gas causes a responsive movement in the pilot valve that opens the main valve and allows inert gas to flow into the tank.

Prior art tank blanketing valves suffer from various problems. One problem is that in an assembled tank blanketing valve, it was not previously possible to conveniently adjust the internal operation or position of pilot valve functional components. The pilot valve and the main valve components had to be precisely machined to achieve a predetermined positional relationship between components. Upon assembly, even slight variations in machining tolerances, operating conditions or even environmental conditions could change the desired operating characteristics of the assembled tank blanketing valve. There was no known way to adjust the positioning of the internal functional components of the pilot valve relative to one another from an external location after valve assembly.

Another problem is that an O-ring seal associated with the pilot valve assembly located entirely within the assembled tank blanketing valve but adjacent to the main valve dome chamber had a tendency to unseat during main valve operation. The unseating occurs as a result of pressure differentials that act upon the seal. The unseating results in excessive inert gas leakage. Reseating of this O-ring can only be accomplished by dismantling the entire tank blanketing valve.

The present invention provides a tank blanketing valve structure which overcomes the foregoing problems.

SUMMARY OF THE INVENTION

More particularly, this invention relates to a new, improved and very useful tank blanketing valve assembly which incorporates a main valve assembly and a cooperating main-valve actuating pilot valve assembly, and wherein the position of certain components of the pilot valve assembly are externally adjustable. The invention also relates to the improved pilot valve assembly.

The improved pilot valve assembly employs an improved combination of an elongated poppet which slidably and longitudinally moves in a cylinder defined by upper and lower cylindrical plug means. The lower plug means is longitudinally adjustable in the pilot valve assembly.

Thus, by the present invention, the slight relative size changes characteristically occurring in pilot valve components, which can result from various causes, for example, machining tolerances, blanketing valve operating conditions, environmental conditions, or the like, can be adjusted and compensated for even after valve assembly. Such adjustability is achieved without adversely affecting the intended functioning of the valve or its components, such as the functioning of gas conducting channels extending in, through and/or adjacent to either the pilot valve poppet body, or of the upper and the lower plug means. The pilot valve is balanced due to the presence of the same top and bottom sealing means. Inlet pressure thus does not effect pilot valve function.

Preferably, the tank blanketing valve assembly of this invention also includes a pressure relief port (or orifice) that is precisely located in the lower plug means so as to be adjacent to an O-ring seal that is supported by the lower plug means. This O-ring seal functions to help seal the channel connecting the pilot valve assembly with the dome chamber of the main valve assembly when the poppet of the pilot valve assembly is in its valve closed position. When the poppet is in its valve open position, however, this port prevents gas pressure changes of the type which occur in the region of this O-ring during operation of the main valve from unseating the O-ring.

Preferably, the tank blanketing valve assembly of this invention also includes an internal pilot valve gas exhaust channel, thereby avoiding the need for external gas conduit means.

The invention further relates to a new and improved combination of a subassembly for a pilot valve of a tank blanketing valve assembly that also employs a coacting and cooperating main valve subassembly as well sure sensing means to which the pilot valve subassembly is responsive. The pilot valve subassembly incorporates a coacting combination of valve body, upper plug, adjustable lower plug, elongated poppet which slidably and longitudinally moves in a cylinder defined by the upper and lower plugs, and a pin-guided biasing spring for the poppet.

The tank blanketing valve assembly of the invention overcomes the foregoing disadvantages of prior art tank blanketing valve assemblies having a fixed interrelationship between the pilot valve components. A tank blanketing valve with a pilot valve assembly wherein upper and lower cylindrical plugs define the poppet cylinder was not known to the prior art so far as now known.

Other and further objects, aims, purposes, features, advantages, embodiments and the like will become apparent to those skilled in the art from the present description, the accompanying drawings and the appended claims.

BRIEF DESCRIPTION OF THE DRAWINGS

In the drawings:

FIG. 1 is side elevational view showing an embodiment of a tank blanketing valve of this invention employed in a typical tank installation;

FIG. 3 is a horizontal sectional view taken along the line III—III of FIG. 2;

DETAILED DESCRIPTION

Figure 2:
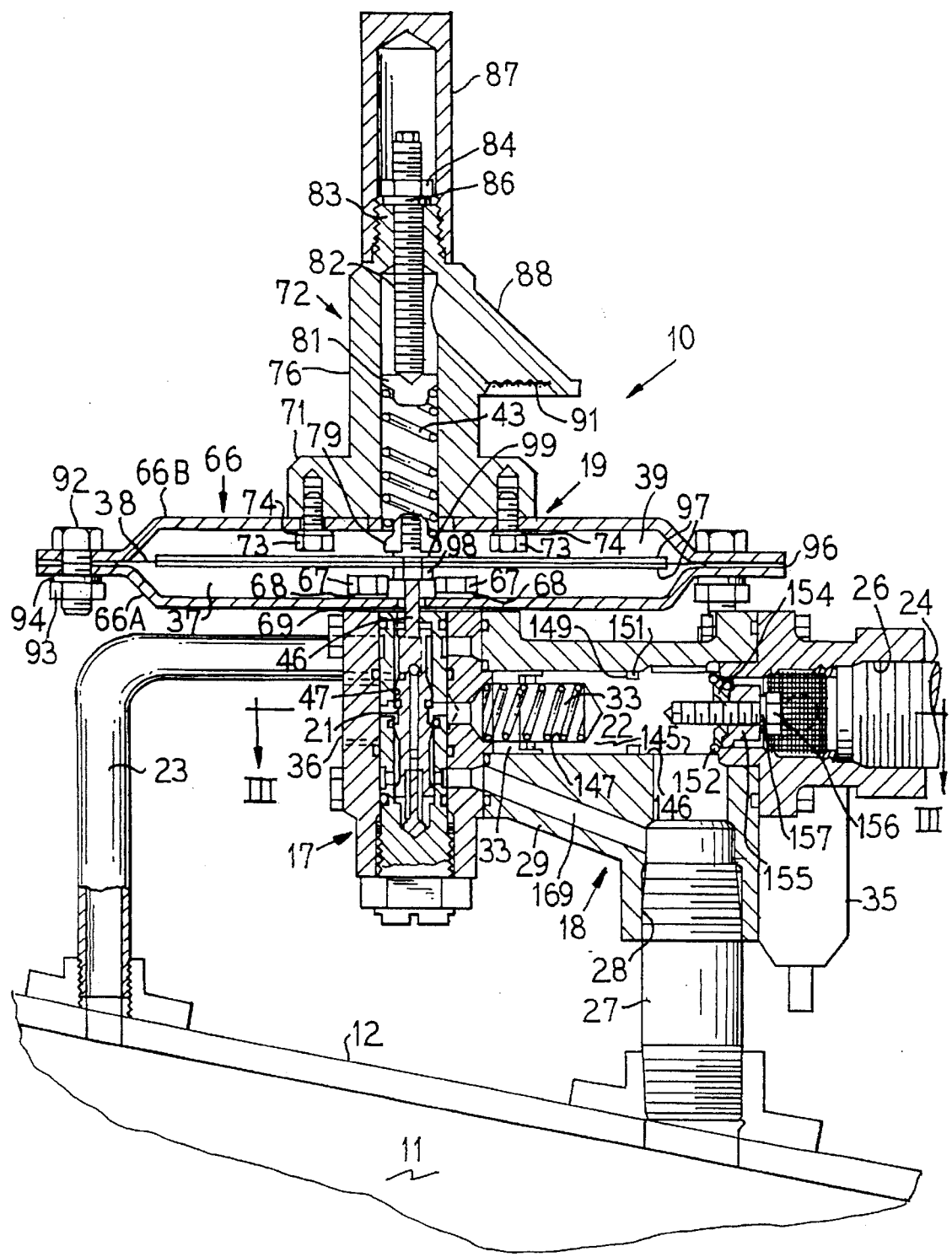
FIG. 2 is a vertical sectional view taken through the center of the tank blanketing valve of FIG. 1, the tank blanketing valve being shown in its closed position.

Referring to FIGS. 1 through 6, there is seen one illustrative embodiment 10 of a tank blanketing valve of this invention. A typical installation for valve 10 is illustrated in FIG. 1 where valve 10 is operably and functionally connected with a top portion or dome 12 of a storage tank 11. The dome 12 is shown independently and separately associated with a conventional conservation vent 13 and with a conventional emergency relief vent 14.

The conservation vent 13 is sized to take care of overpressure and Vacuum conditions brought about by pumping and thermal conditions or certain equipment failures. The vent 13 is associated with a pressure pallet (not detailed) whose pressure setting is set at a slightly higher setting than the blanketing pressure in the vapor space beneath dome 12 in the tank 11, but which setting is below the maximum pressure that the tank 11 is designed to withstand. Similarly, the vent 13 is also associated with a vacuum pallet (not shown) which is set to open to atmospheric air when a higher vacuum pressure (i.e., a lower subatmospheric or reduced pressure) occurs in tank 11 than is reached in normal operating conditions, such setting being a reduced pressure that is above the negative pressure that the tank 11 is designed to withstand.

The vent 13 is here illustratively connected in series with a conventional flame arrester 16 that provides additional protection in the event of inert gas failure in tank 11.

As shown in FIG. 1, the tank blanketing valve 10 is illustratively being used in a tank blanketing gas application to regulate the pressure of an inert gas, such as nitrogen or the like, existing on the top surface of a liquid (not indicated) that is stored in tank 11. The valve 10 senses the pressure of the tank gas blanket and opens to admit more inert gas when the gas pressure in tank 11 drops below a set pressure (as when the liquid level drops). The valve 10 closes and stops gas admission when gas pressure in tank 11 builds back above the set pressure.

As shown, for example, in FIG. 2, the tank blanketing valve 10 comprises two separate valves cooperatively operating in tandem, a pilot valve 17 which is controlled by the tank 11 sensed pressure and a main valve 18 whose opening and closing is controlled by the pilot valve 17. The main valve 18 when open provides flow of inert gas into tank 11 from an inert gas supply (not shown). The pilot valve 17 responds to pressure changes sensed by a pressure sensor 19 resulting in movement of a poppet 21 in valve 17. Movement of poppet 21 causes a piston 22 in main valve 18 to move and resultingly admit inert gas into tank 11. Valve 10 is arranged and adjusted so that the valves 17 and 18 and pressure sensor 19 operate responsively to a predetermined set pressure that is itself dependent upon the pressure differential existing at any given time between sensed atmospheric pressure and sensed internal tank (head) pressure.

The set pressure of valve 10 can be regarded as the pressure at which the main valve 18 opens. In general, the pilot valve 17 begins to leak inert gas at a pressure slightly above the set pressure (or set point). As the pressure thereafter decreases to the set point, the pilot valve 17 opens fully, so that the pressure holding the main valve in a closed position drops and allows the main valve to open. Inert gas flow into the tank 11 from valve 18 raises the tank inert gas pressure to a point which causes each of the main valve 18 and the pilot valve 17 to reseal into their respective closed configurations. The poppet 21 in combination with other pilot valve components provides for pressure balanced operation that achieves a dependable, consistent opening pressure over the allowable range of inlet inert gas supply pressures.

Three external connecting conduits are required for operation of valve 10. One conduit 23 extends between dome 12 and pilot valve 17 to provide a source for the gas pressure in tank 11 that is sensed and compared by valve 10 to atmospheric air pressure. A second conduit 24 extends from the inert gas supply and connects with the inlet channel 26 in the main valve 18. A third conduit 27 connects the outlet channel 28 of the main valve 18 with tank 11.

The body 29 of main valve 18 is also provided with an external conduit 31 (see FIG. 3) which extends from inlet channel 26 to a small orifice 32 that opens into the dome chamber 33 of the main valve 18 whereby inert gas can bleed into the dome chamber 33 from inlet channel 26. Conduit 31 is preferably functionally associated with a conventional in-line filter 35 (not detailed). Preferably, inert gas entering conduit 31 and valve 18 passes through a conventional screen assembly 40 that is nestably received in a neck region of inlet channel 26. Alternatively, inert gas can be fed to orifice 32 through an internal channel (not shown) provided in the valve body 29, or through a channel and orifice in piston 22 (not shown).

The conduit 23 is preferably connected to the dome 12 at a distance sufficiently spaced from the connection location of conduit 27 so that an inert gas flow stream entering tank 11 from conduit 27 will not effect the gas pressure in conduit 23. Conduit 23 interconnects with channel 34 in the body 36 of pilot valve 17. The gas pressure in tank 11 is thus conveyed to the chamber 37 of pressure sensor 19. Chamber 37 is associated with the underside of the diaphragm 38 in pressure sensor 19.

Figure 4:
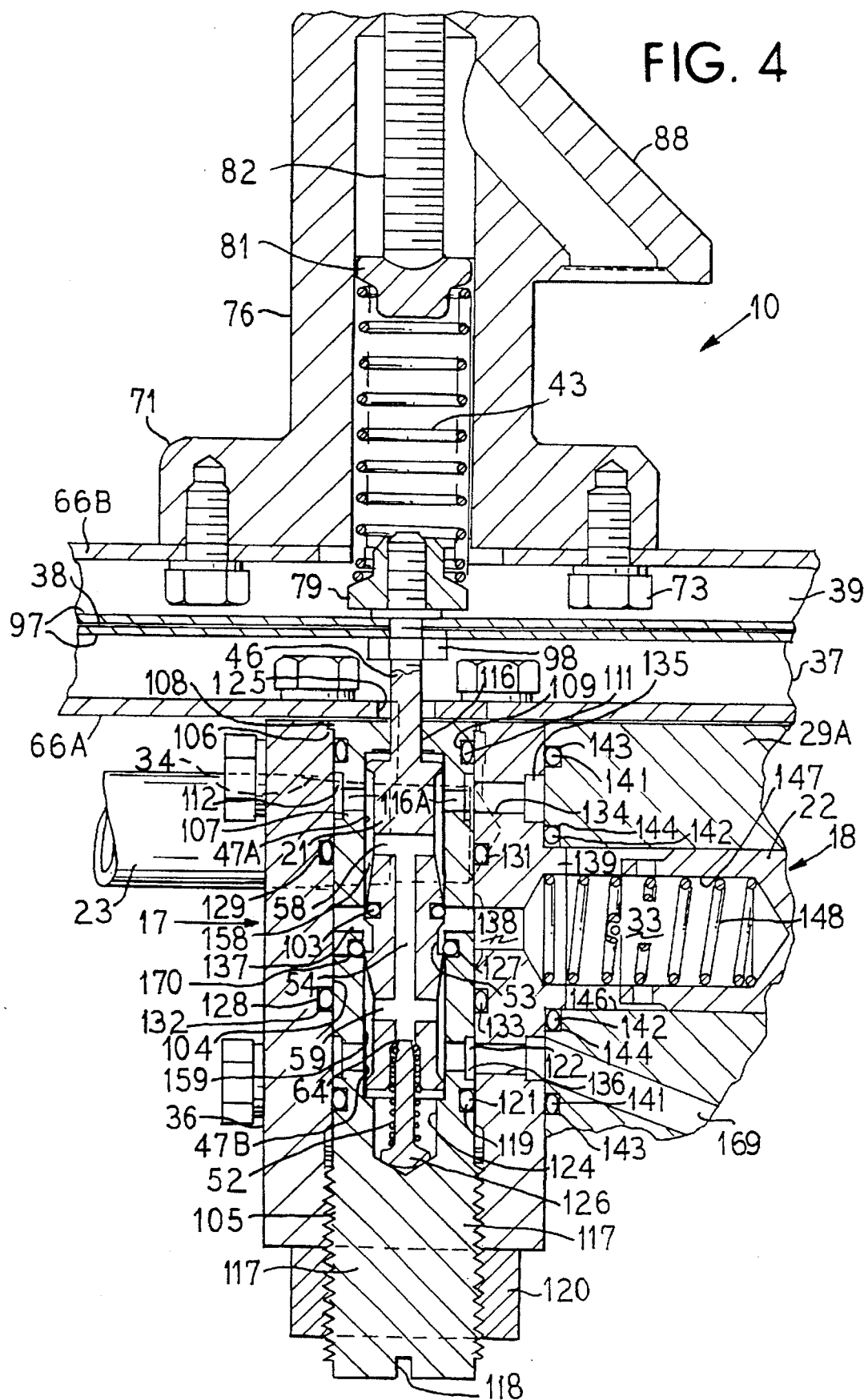
FIG. 4 is an enlarged fragmentary view of the pilot valve of FIG. 2 showing the pilot valve in its closed position with the popper rotated 90° relative to its position in FIG. 1.

As shown, for example, in FIGS. 2 and 4, the pressure sensor 19 is itself of the diaphragm type broadly previously known in the art and employs a case 66 defined by a saucer-configured lower case 66A and a rimmating, inverted (relative to case 66A), saucer-configured upper case 66B. Case 66A is mounted centrally and horizontally against the flattened upper face of pilot valve body 36 by means of hex screws 67 and associated lock washers 68 with a gasket 69 positioned between case 66A and body 36. Case 66B is mounted centrally and horizontally against the flattened base 71 of an air intake and set point adjustment subassembly 72 by means of hex screws 73 and associated lock washers 74.

In the air intake and set point adjustment subassembly 72, the number of independent cooperating components is preferably (as shown) minimized to reduce parts and assembly costs. The base 71 is integrally formed and connected with a spring guide 76. A coiled compression set spring (preferably stainless steel) 43 is located in spring guide 76 and is yieldingly compressed between a lower anchor 79 and an upper anchor 81. The upper anchor 81 is slidably and longitudinally movable within spring guide 76. An elongated set screw 82 threadably extends through the upper outward integral neck 83 of spring guide 76 so that the forward inner end of set screw 82 abuts against, but is rotatable relative to, the back face of upper anchor 81. For fixing the position of set screw 82 relative to neck 83, the rearward portion of set screw 82 is threadably associated with a jam nut 84 and a lock washer 86 that circumferentially extends interveningly between nut 84 and the top flat face of neck 83. The circumferential outside of neck 83 is threadably associated with a removable protective cap 87. The spring guide 76 is integrally formed with an elbow-type fitting 88 that is preferably welded to a conventional screen 91 assembly.

In case 66, upper case 66B is connected along its perimeter to lower case 66A by a plurality of circumferentially spaced interconnected hex screws 92 and jam nuts 93 with lock washers 94. The perimeter of diaphragm 38 is associated between the upper case 66B and lower case 66A with an intervening gasket 96. The mid-central region of a pressure-responsive diaphragm 38 whose periphery is held between the joining perimeter of upper case 66B and lower case 66A as shown is joined on each side thereof by one member of a pair of rigid plates 97. The lower anchor 79 is threadably secured to the center of plates 97 by a hex screw 98 that extends through the plates 97 and this combination is provided with a lock washer 99. The head of hex screw 98 serves as a stop for the axially upwardly projecting stem 46 of poppet 21. Case 66 is thus divided into two separate chambers, an upper chamber 39 which is at atmospheric pressure and charged with air, and the lower chamber 37 which is at tank pressure and charged with inert gas from tank 11.

In effect, pressure in tank 11 exerts a force on the lower side of diaphragm 38 while atmospheric pressure (which is conveyed to the opposing chamber 39 through fitting 88) plus the force of the adjustable spring 43 exert a downward force on diaphragm 38 upon the top side thereof. When the pressure in tank 11 drops below the set pressure (which is fixed by the compression setting chosen for spring 43), then the head of hex screw 98 (see FIG. 4, for example) that is abuttingly engaged with the longitudinally projecting stem 46 of the poppet 21 pushes downwardly on the end of stem 46. This causes poppet 21 to move downwardly, and moves poppet 21 from an upper valve closed position as shown, for example, in FIG. 4 to a lower valve open position as shown, for example, in FIG. 5, thereby relieving the pressure in chamber 33 and opening the pilot valve 17.

Figure 6:
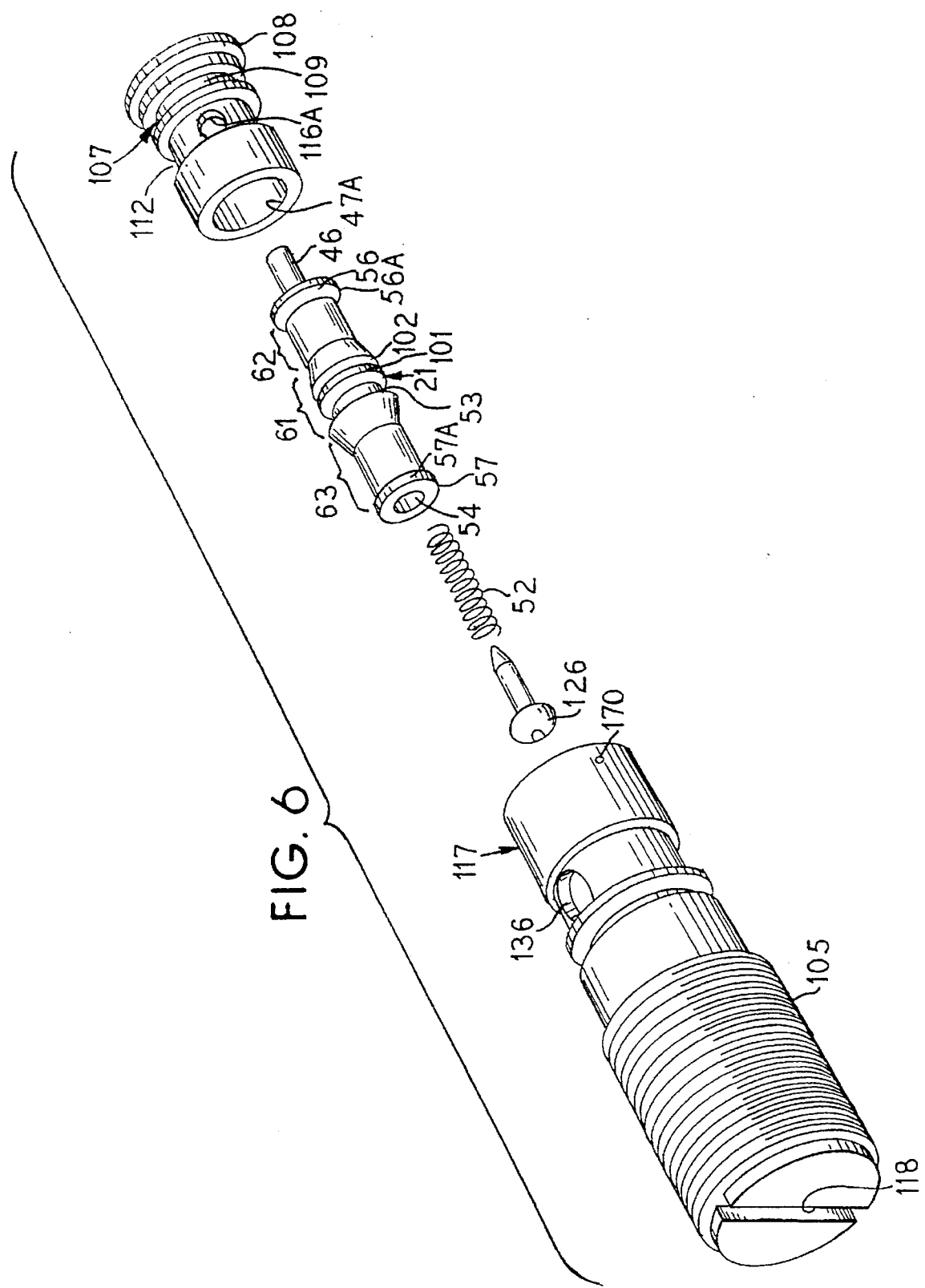
FIG. 6 is an exploded perspective view of the poppet/pin/spring plug subassembly employed in the pilot valve assembly utilized in the embodiment shown in FIGS. 2 through 5 but with O-rings removed.

As shown, for example, in FIG. 6, the poppet 21 is generally circular in cross-section and has a characteristic barrel-like profile (medially thickened exterior mid-region 61) when viewed in side elevation. Opposite ends 56 and 57 of poppet 21 are circumferentially outwardly flanged. A circumferentially extending longitudinally broadened groove 53 is defined around its mid-region. The stem 46 axially and outwardly projects integrally from its upper opposite end 56. From its lower opposite end 57, a channel 54 axially extends upwardly through the poppet 21 to a terminal location that is in axially spaced relationship to the upper opposite end 56.

Radially extending channels 58 (see FIGS. 4 and 5) and 59 extend through the side walls thus defined in poppet 21 and intersect channel 54 in each of the two medial poppet regions 62 and 63 (see FIG. 6) of reduced diameter, such regions being located between each opposite end 56 and 57 and the mid-region 61. The respective outside diameter of each of the flanges 56A and 57A at respective opposite ends 56 and 57, and also of the circumferential ridges on each longitudinal side of the groove 53 in mid-region 61, is such that the poppet 21 is positioned and guided for longitudinal slidable movements in the cylindrical chamber 47 defined by coaxial bores 47A and 47B in the body 36 of pilot valve 17 that are associated respectively with the upper plug 107 and the lower plug 117, as further described below.

The stem 46 extends upwardly through valve body 36 and upper cylindrical plug 107, and into the chamber 37 through an aperture 125 in case 66A, so that the forward end of stem 46 abuts against the head of hex screw 98. Stem 46 is retained in engagement with the head of hex screw 98 by the coiled compression spring 52 which axially extends between a pocket 124 axially defined in the bottom of the bore 47B in lower plug 117 and a shoulder 64 provided in channel 54 that is inset from the widened open end region of channel 54.

Figure 5:
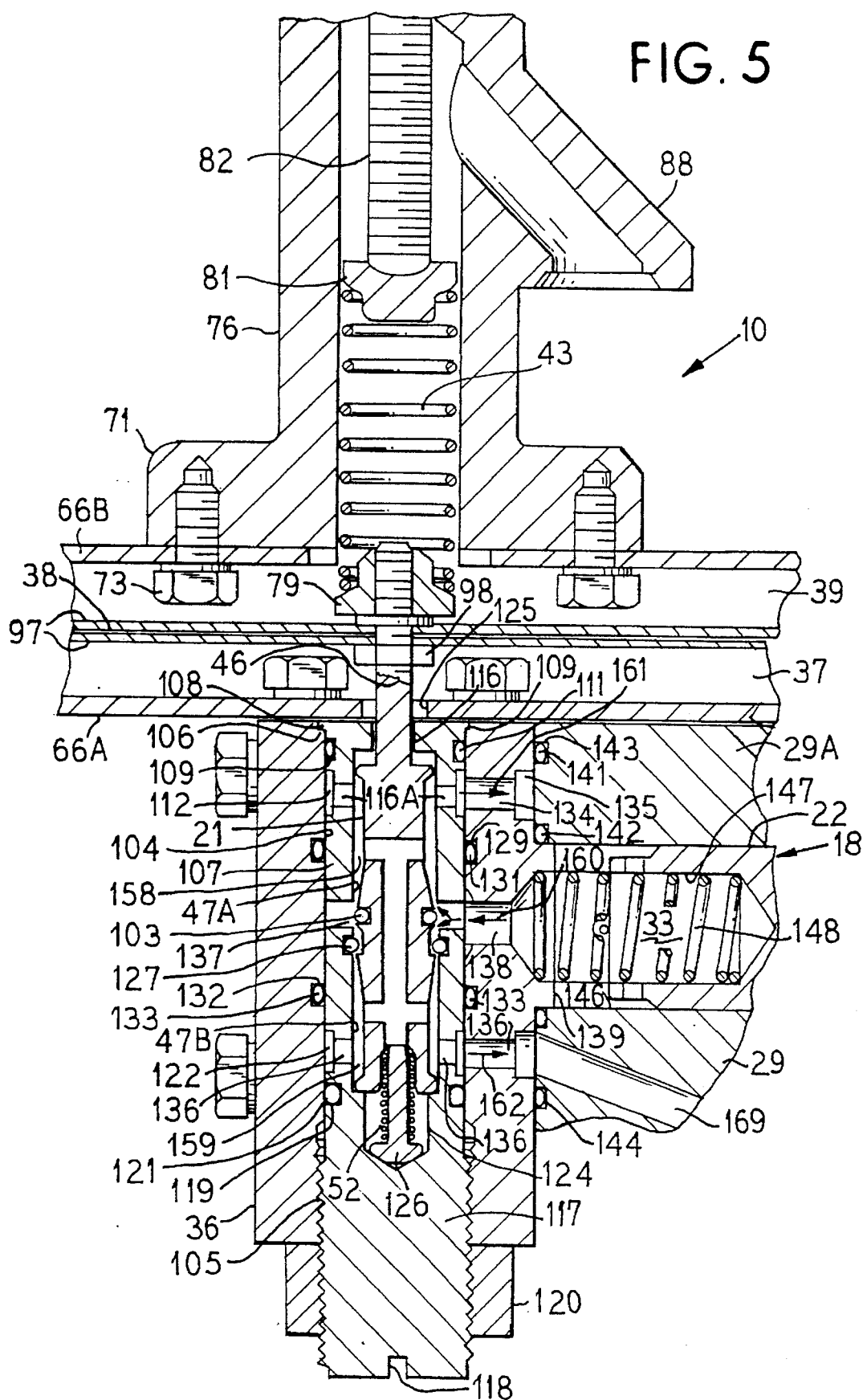
FIG. 5 is an enlarged fragmentary view similar to FIG. 4, but with the tank pressure sensing conduit removed, and showing the pilot valve in its open position.

As shown, for example, in FIG. 6, the poppet 21 is provided with an O-ring receiving circumferential groove 101 in the upper ridge 102 (that is, the ridge defining the longitudinal side of the groove 53 in poppet 21 which ridge is adjacent the poppet upper opposite end 56), and this groove 101 is provided with an O-ring 103 (as shown, for example, in FIGS. 4 and 5).

The valve body 36 is provided with a medial bore 104 that extends perpendicularly therethrough relative to the mid-region of lower case 66A. The upper end region of bore 104 is provided with a square profiled shoulder 106 at its upper end. The lower end region 105 of bore 104 is circumferentially internally threaded. Into the upper end region of bore 104 the upper cylindrical plug 107 is slidably engaged. The upper end of upper plug 107 is provided with a circumferentially extending flange 108 which is nestably received in the shoulder 106 and which limits downward travel of upper plug 107. After insertion, the upper plug 107 is held in place by the associated overlying lower case 66A.

Downwardly from, but adjacent to, flange 108, the cylindrical outer surface of the upper plug 107 is provided with a circumferentially extending groove 109 into which an O-ring seal 111 (see FIGS. 4 or 5) is seated. In a medial outer surface location along the length of upper plug 107, a circumferentially extending channel 112 is preferably provided. Channel 112 is longitudinally adjacent to the groove 109. Extending axially upwardly in upper plug 107 from its lower end is a bore 47A which terminates in spaced relationship to the upper end of upper plug 107. The inner upper end of bore 47A in upper plug 107 is provided with an axially extending smaller aperture or channel 116 whose diameter is adapted to receive slidably therein the stem 46 of poppet 21. In the location between the longitudinally medial region occupied by channel 112 and the lower end of upper plug 107, a circumferentially extending groove 129 is defined in the circumferential wall of bore 104 into which an O-ring seal 131 is seated. The O-ring seals 111 and 131 function to isolate and place the channel 112 in a gas-tight relationship relative to upper plug 107 and body 36. Bore 47A has a diameter that is adapted to slidably receive the upper portion of the body of poppet 21. A channel 116A extends diametrically through the side walls of upper plug 107 in the region of the circumferential channel 112. Channel 116A intersects (connects with) bore 47A.

Into the lower end region of bore 104, the lower cylindrical plug 117 is slidably engaged. A lower end region of lower plug 117 is exteriorly circumferentially threaded and adapted for engagement with a threaded lower end region 105 of bore 104. The lower end of lower plug 117 is provided with a diametrically extending groove 118 for engagement with a screw driver or like tool (not shown) for lower plug 117 positioning and adjustment purposes. The protruding portion of lower plug 117 relative to the lower end of body 36 is preferably provided with a lock nut 120 for fixing a desired set position for lower plug 117. Lock nut 120 is preferably fixed to lower plug 117 at assembly to allow for reassembly in the field. The upper interior end of lower plug 117 terminates in axially spaced, adjacent relationship to the lower interior end of upper plug 107. When the upper plug 107 and the lower plug 117 are assembled in the bore 104 of body 36, a circumferentially extending peripherally located cavity 137 is defined therebetween that is contiguous with bore 104. The terminal position of the upper end of lower plug 117 is determined by the extent to which the threaded portion of lower plug 117 is threadably engaged with the threaded terminal portion 105 of the bore 104.

Upwardly from, but longitudinally adjacent to, the threaded lower portion of lower plug 117, a circumferentially extending groove 119 is provided in lower plug 117 into which an O-ring seal 121 is seated. Upwardly from, but longitudinally adjacent to, the groove 119, a circumferentially extending channel 122 is provided in the outer circumferential side wall of lower plug 117. Extending axially downwardly from the inner end of lower plug 117 is a bore 47B which terminates in longitudinally spaced relationship to the lower end of lower plug 117. The inner lower end of bore 47B is provided with a smaller blind aperture or pocket 124 whose diameter is adapted to slidably receive therein the head of a headed pin 126 whose shank is circumferentially associated with the coiled spring 52. In the location between the medial region occupied by channel 122 and the upper end of lower plug 117, a circumferentially extending groove 132 is defined in the circumferential wall of bore 104 into which an O-ring seal 133 is seated. The O-ring seals 121 and 133 function to isolate and place the channel 122 in a gas-tight relationship relative to lower plug 117 and body 36. Bore 47B has a diameter that is adapted to slidably receive the lower portion of the body of poppet 21. A channel 136 extends diametrically through lower plug 117 in the region of the circumferential channel 122. Channel 136 intersects (connects with) bore 47B.

Communicating with channel 112 in upper plug 107 is a transverse channel 134 that is defined in body 36. Communicating with channel 122 in lower plug 117 is a transverse channel 136 that is also defined in the side wall of body 36. Communicating with the cavity 137 that is located between the lower end of upper plug 107 and the upper end of lower plug 117 is a transverse channel 138 that is likewise defined in the side wall of body 36. Each of the channels 134 and 136 in the side wall of body 36 communicates with a longitudinally oriented circular groove or channel 135 formed in the outer surface of the side wall of body 36. Channel 138 extends through the side wall of body 36 and communicates with dome chamber 33 in body 29 respective. The mouths of the channels 134 and 136 are thus interconnected together by a generally circumferentially defined channel 135 (not detailed) defined in the adjacent side wall of body 36. The mouth of the channel 138 is provided with an outstanding shoulder 139 that extends circumferentially thereabout.

The body 29 of the main valve 18 is adapted to engage abuttingly over the shoulder 139 and the adjacent side wall portions of the pilot valve body 36 that extend about the mouths of the channels 134 and 136. For sealing and isolation purposes, the mouths of the channels 134, 135, 136 and 138 are provided with O-ring seals 141 and 142 which are seated in mating circular grooves 143 and 144 respective defined in valve body 29.

The mouth of channel 138 effectively helps define the so-called dome chamber 33 of the main valve 18. Thus, the mouth of channel 138 is generally coaxial with a bore or channel 146 in body 29. Channel 146 extends generally perpendicularly to the bore 104 in body 36 and channel 146 extends through the body 29. The piston 22 is adapted for axial reciprocal sliding movements in bore 146. The forward end of piston 22 has axially defined therein a pocket channel 147. A coiled compression spring 148 (preferably stainless steel) is inserted into and supported by the side walls of channel 147. One end of spring 148 rests against the interior end of channel 147 in piston 22 while the other end of spring 148 rests against the entrance lip of channel 138 in body 36. A rear portion of channel 146 has an aperture 145 (see FIG. 2) that interconnects with the inert gas outlet channel 28. The adjacent rear end wall of channel 146 interconnects with the inert gas inlet channel 26.

In order to provide a sealed arrangement to isolate dome chamber 33 from inset channel 26, the side of piston 22 is provided with a circumferential groove 149 in which an O-ring seal 151 is seated. Another O-ring seal 152 that extends circumferentially about the terminal end of piston 22. O-ring seal 152 is retained in position at the end of piston 22 by a plate 154. The O-ring 152 is thus effective to seal gas flow between conduit 24 and conduit 27. A screw 156 retains a flow plug 155 at the end of the piston 22. In combination with lock washer 157, the hex screw 156 holds the O-ring 152, the cap plate 154 and the flow plug 155. Thus, when the piston 22 is biased into a normally rearward closed position in bore 146 (as shown in FIG. 2) by spring 148, both the outlet channel 28 and the inlet channel 26 are in a sealed shut configuration.

In the blanketing valve 10 closed position that is shown for example in FIGS. 2 and 4, the poppet 21 is in its upward closed position and the piston 22 is in its rearward closed position. Relative to poppet 21, the O-ring seal 103 is in sealed engagement with the lower edge of bore 47A and O-ring seal 127 is in sealed engagement with the lower ridge edge of the groove 53 of poppet 21. An elongated chamber 158 is radially located between poppet 21 and bore 47A in poppet region 62, and an elongated chamber 159 is radially located between poppet 21 and bore 47B in poppet region 63. Chambers 158 and 159 are in continuous communication with each other through channels 54, 58 and 59 in poppet 21. A negligible amount of gas leakage at tank pressure can occur from chamber 37 down along the sides of stem 46 into chamber 158. Gas enters the dome chamber 33 through conduit 31 and orifice 32 and the pressure in the dome chamber 33 is substantially at the supply pressure of the gas in conduit 24.

Opening of the pilot valve 17 is achieved through only a small axial movement of poppet 21 downwardly from its normally closed position as shown in FIG. 4. This axial poppet 21 movement occurs in the elongated, generally cylindrical chamber 47 (defined by coaxial bores 47A and 47B) in the respective plugs 107 and 117). Poppet 21 thus moves to its pilot valve open position as shown in FIG. 5. Such an opening of pilot valve 17 as shown in FIG. 5 vacates the gas from the volume of dome chamber 33 as shown by the arrows 160 in FIG. 5 by allowing gas flow past O-rings 103 and 127 into channels 134 and 136 and out through the pilot exhaust channel 169 in body 29 into outlet conduit 27 (see FIG. 2). Direction of gas flow in channels 134 and 136 is shown by arrows 161 and 162 respectively and in channel 138 by the arrows 160. This passage, and the gas pressure changes in the dome chamber 33, cause the piston 22 of main valve 18 to open, thereby allowing inert gas flow into the tank 11 through conduits 24 and 27.

Thus, the piston 22 is normally held closed when the pressure in dome chamber 33 equals the inlet pressure in conduit 24 because there is a larger area of piston 22 exposed to the dome chamber 33 pressure than the area of piston 27 that is exposed to the inlet pressure in conduit 24. A significant drop in the pressure in dome chamber 33, however, allows the piston 22 to be pushed towards the dome chamber 33 and into a main valve open configuration open by the inert gas inlet pressure in conduit 24.

When inert gas flow into the tank 11 raises the tank 11 pressure above the set pressure, then the diaphragm 38 is pushed up, thereby allowing the poppet 21 to raise up responsive to the expansive force of the spring 52 under the poppet 21 until the poppet 21 reseals at O-ring seals 103 and 127. When the poppet 21 reseals, the pressure in dome chamber 33 builds back up to the inlet pressure in conduit 24 thereby pushing the piston 22 into its fully closed position shown in FIGS. 2 and 4 and shutting off flow of inert gas into tank 11.

Also, those skilled in the art will appreciate that various locations and component arrangements can be utilized for the O-ring seals employed for sealing the poppet 21 relative to the channel 137. However, the arrangement shown in FIGS. 2–6 is presently preferred. With such an arrangement, it is preferred to provide a pressure equalization orifice 170 (see, for example, FIG. 6) for the lower O-ring seal 127. Orifice 170 extends radially through the outer wall of lower plug 117 into connecting relationship with the groove 128. The orifice 170 functions to prevent gas pressure changes of the type which occur in the region of the O-ring seal 127 when the poppet 21 moves to its valve open position from unseating O-ring seal 127.

Thus, in the pilot valve assembly of this invention, a valve body is employed having a bore defined therethrough. This bore is here regarded for descriptive purposes as having an upper end and an opposite lower end.

First and second cylindrical plug means are inserted into respective said upper and lower ends of the bore. Each plug means is adjacent to a different one of the bore opposite ends. The second plug means includes thread means engagable with a threaded portion of the valve body bore whereby the second plug means is longitudinally adjustably positionable in the bore. The first and the second plug means together cooperate to define coaxial portions of a longitudinally extending, medial cylindrical cavity with an adjoining circumferential peripheral channel located between longitudinally adjacent, spaced interior end portions of the first and the second plug means.

Elongated poppet means is included which is longitudinally slidably positioned in the cylindrical cavity for movement between an upper valve closed position and a lower valve open position. This poppet means has an upper end located in the first plug means and an opposite lower end located in the second plug means, and external circumferential poppet side walls.

An upwardly projecting stem at the poppet upper end is provided.

The poppet includes a pair of circumferentially extending poppet chambers. Each chamber is defined along and in a different portion of the poppet side walls. Each one of these poppet chambers radially adjoins the adjacent cylindrical cavity and is longitudinally adjacent to a different respective one of the opposite bore ends. Internal conduit means in the poppet interconnects each one of the poppet chamber means.

The poppet side walls have longitudinally adjacent circumferential upper and lower mid-region portions that radially outwardly extend and that cooperate with O-ring sealing means. Thus, individual sealing engagement of these mid-region portions circumferentially about the respective upper and lower inner end portions of the first and the second plug means is achieved when the poppet means is in its upper valve closed position.

Spring means 52 for yieldingly biasing the poppet 21 in the closed position is provided. Thus, when the poppet 21 is in the upper valve closed position, then each of the two poppet chambers is sealed from the peripheral channel. However, when the poppet means is in its lower valve open position, then each of the two poppet chambers communicates with the peripheral channel.

Preferably, in the inventive pilot valve assembly, each of the upper and the lower plug means has defined therein a circumferentially extending plug channel in a longitudinal mid-region thereof so as to be located in cooperative, radially adjacent relationship to adjacent portions of the valve body bore. Also, at least one radially extending plug channel extends from said circumferentially extending plug channel through each of said plug means to the radially adjacent one of said poppet channels. The valve body also has defined therein channel means which interconnect together each of the two plug channels. Further interconnected by channel means are the plug channels with an output channel of the main valve assembly. Thus, when said poppet means is in its lower valve open position, gas can pass from the peripheral channel to the output channel.

Preferably, in the inventive pilot valve assembly, the sealing engagement between the upper mid-region portion and the inner end portion of the first plug means is achieved by an upper O-ring sealing means which is received in a circumferential groove defined around an upper mid-region portion. Also, the sealing engagement between the lower mid-region portion and the end portion of the second plug means is achieved by a lower O-ring sealing means which is received in a circumferential groove defined in the second plug means and extending around the cylindrical cavity adjacent to the inner end portion of the second plug means.

Preferably, in the pilot valve assembly of this invention, there is provided a pressure equalization orifice for the lower O-ring sealing means in the second plug means. This orifice preferably extends radially through the second plug means at a longitudinal position therealong that is opposite the circumferential groove therein.

The foregoing description makes use of an illustrative embodiment of this invention, and no limitations upon the present invention are to be implied or inferred therefrom.

What is claimed is:

1. A pilot valve for operating a main valve in a tank blanketing valve having a pressure sensing means connected to said pilot valve, said pilot valve comprising:

a valve body having a bore with opposite ends;

first and second cylindrical plug means inserted into respective ones of said opposite ends, said second plug means including thread means engagable with said bore for adjustable positioning thereof;

said first and said second plug means cooperating to define in said bore a longitudinally extending, cylindrical cavity with an adjoining medial circumferential peripheral channel;

poppet means in said cylindrical cavity movable between a valve closed position and a valve open position, said poppet means having external circumferential poppet side walls and opposed poppet ends, an upwardly projecting stem at one said poppet end for contact with said pressure sensing means, a pair of circumferentially extending poppet chamber means, each one thereof being defined adjacent said cylindrical cavity in a different longitudinally spaced portion of said poppet side walls, internal conduit means interconnecting said poppet chamber means, and O-ring sealing means for circumferential sealing engagement of mid-region portions of said poppet side walls about said peripheral channel for isolating said peripheral channel when said poppet means is in said valve closed position; and spring means for yieldingly biasing said poppet means in said valve closed position;

vent channel means defined in said valve body and communicating with said bore whereby, when said poppet means is in said valve open position, each of said poppet chamber means communicates with said peripheral channel and said peripheral channel communicates with said vent channel means.

2. A pilot valve assembly suitable for incorporation into a tank blanketing valve of the type that incorporates said pilot valve assembly, a main valve assembly, and pressure sensing means connected to said pilot valve assembly, and wherein said main valve assembly is operated by said pilot valve assembly, said pilot valve assembly comprising:

a valve body having a bore defined therethrough, said bore having an upper end and an opposite lower end;

first and second cylindrical plug means inserted into respective said upper and lower ends of said bore, each said plug means being adjacent a different one of said opposite ends, said second plug means including thread means engagable with said bore whereby said second plug means is longitudinally adjustably positionable in said bore;

said first and said second plug means together cooperating to define a longitudinally extending, medial cylindrical cavity with an adjoining circumferential peripheral channel between longitudinally adjacent, spaced end portions of said first and second plug means;

elongated poppet means which is longitudinally slidably positioned in said cylindrical cavity for movement between an upper valve closed position and a lower valve open position, said poppet means having:

(a) an upper end located in said first plug means and an opposite lower end located in said second plug means, and external circumferential side walls, (b) an upwardly projecting stem at said upper end, (c) a pair of circumferentially extending poppet chamber means, each one thereof being defined in a different portion of said side walls whereby each one of said poppet chamber means radially adjoins said cylindrical cavity and is longitudinally adjacent to a different respective one of said opposite bore ends, (d) internal conduit means interconnecting each one of said poppet chamber means, and (e) said side walls having circumferential upper and lower mid-region portions that radially outwardly extend and that cooperate with O-ring sealing means whereby sealing engagement of said mid-region portions circumferentially about said respective upper and lower end portions of said first and said second plug means is achieved when said poppet means is in said upper valve closed position; and spring means for yieldingly biasing said poppet means in said upper valve closed position relative to said lower plug means;

whereby, when said poppet means is in said upper valve closed position, each of said poppet chamber means is sealed from said peripheral channel, and, when said poppet means is in said lower valve open position, each of said poppet chamber means communicates with said peripheral channel.

3. The pilot valve assembly of claim 2 wherein each of said upper and said lower plug means has defined therein:

(a) a circumferentially extending plug channel in a longitudinal mid-region thereof located in cooperative radially adjacent relationship to adjacent portions of said bore, (b) at least one radially extending plug channel extending from said circumferentially extending plug channel through each said plug means to the radially adjacent one of said poppet channels; and wherein said valve body has defined therein channel means which interconnects together each of said plug channels and which also interconnects said plug channels with an output channel of said main valve assembly;

whereby, when said poppet means is in said lower valve open position, gas can pass from said peripheral channel to said output channel.

4. The pilot valve assembly of claim 2 wherein:

(a) said sealing engagement between said upper mid-region portion and said end portion of said first plug means is achieved by an upper O-ring sealing means which is received in a circumferential groove defined around said upper mid-region portion; and (b) said sealing engagement between said lower mid-region portion and said end portion of said second plug means is achieved by a lower O-ring sealing means which is received in a circumferential groove defined in said second plug means around said cylindrical cavity adjacent to said end portion of said second plug means.

5. The pilot valve assembly of claim 4 wherein a pressure equalization orifice for said lower O-ring sealing means is provided in said second plug means, and said orifice extends radially through said second plug means opposite said circumferential groove therein.

6. A pilot valve assembly suitable for incorporation into a tank blanketing valve comprising:

a valve body having a bore defined therethrough, said bore having an upper end and an opposite lower end;

two cylindrical plug means in said bore, each one being adjacent a different one of said opposite ends, thereby defining respective upper and lower plug means, said lower plug means being threadably engagable with a portion of said lower plug means whereby said lower plug means is selectively longitudinally positionable in said bore and said upper plug means including retaining means for fixedly positioning said upper plug means in said bore;

said upper and said lower plug means in said bore together defining an elongated cylindrical cavity with a circumferential medial channel therebetween;

said upper and said lower plug means defining in cooperate combination with said valve body:

(a) a medial channel means that interconnects with said medial channel, and (b) peripheral channel means that interconnects medial side portions of each of said upper and said lower plug means with a passageway which is defined in said valve body;

elongated poppet means which is longitudinally slidably positioned in said cylindrical cavity for movement between an upper valve closed position and a lower valve open position, said poppet means having:

(a) an upper end and an opposite lower end, and external circumferential side walls, (b) an upwardly projecting stem at said upper end, (c) a pair of circumferentially extending poppet chamber means each one defined in said side walls so as to be radially adjoining said cylindrical cavity and longitudinally adjacent to a different respective one of said opposite ends, (d) internal conduit means interconnecting each one of said poppet chamber means, and (e) said side walls having circumferential mid-region portions that radially outwardly extend and that cooperate with O-ring sealing means so that sealing engagement circumferentially about upper and lower sides of said circumferential peripheral channel is achieved between said poppet means and said first and said second plug means when said poppet means is in said upper valve closed position; and spring means and associated spring pin guidance means at said poppet lower end in said lower plug means for yieldingly biasing said poppet in said upper valve closed position, whereby, when said poppet means is in said upper valve closed position, said poppet chambers are each sealed from said medial channel, and, when said poppet means is in said lower valve open position, said poppet chambers communicate with said medial channel so that gas can pass from said head chamber to said passageway.

7. The pilot valve assembly of claim 6 wherein each of said upper and said lower plug means has defined therein:

(a) a circumferentially extending plug channel in a longitudinal mid-region thereof located in cooperative radially adjacent relationship to adjacent portions of said bore, (b) at least one radially extending plug channel extending from said circumferentially extending plug channel through each said plug means to the radially adjacent one of said poppet channels; and wherein said valve body has defined therein channel means which interconnects together each of said plug channels and which also interconnects said plug channels with an output channel of said main valve assembly;

whereby, when said poppet means is in said lower valve open position, gas can pass from said peripheral channel to said output channel.

8. The pilot valve assembly of claim 6 wherein:

(a) said sealing engagement between said upper mid-region portion and said end portion of said first plug means is achieved by an upper O-ring sealing means which is received in a circumferential groove defined around said upper mid-region portion; and (b) said sealing engagement between said lower mid-region portion and said end portion of said second plug means is achieved by a lower O-ring sealing means which is received in a circumferential groove defined in said second plug means around said cylindrical cavity adjacent to said end portion of said second plug means.

9. The pilot valve assembly of claim 6 wherein a pressure equalization orifice for said lower O-ring sealing means is provided in said second plug means, and said orifice extends radially through said second plug means opposite said circumferential groove therein.

10. In a tank blanketing valve of the type that is associatable with a tank and that incorporates:

(a) a housed diaphragm means which moves responsive to the pressure differential between atmospheric pressure and internal tank gas pressure;

(b) a pilot valve assembly having a poppet means which longitudinally reciprocally moves responsively to movements of said diaphragm means; and (c) a main valve assembly having a dome chamber that is associated with said pilot valve assembly and having a reciprocating piston with a normally closed configuration, said piston being associated with said head chamber and said piston being displaced into a predetermined valve open configuration when gas pressure in said head chamber drops below a supply line pressure, thereby to permit passage of pressurized inert gas, whereby, when said poppet means moves to a predetermined valve open position, gas pressure in said head chamber falls below said supply line pressure, and said piston moves to said valve open configuration, and when said poppet means returns to a predetermined valve closed position, gas pressure in said head chamber rises to at least said supply line pressure, and said piston returns to said normally closed configuration, the improvement which comprises a pilot valve assembly comprising:

a valve body having a bore defined therethrough, said bore having an upper end and an opposite lower end;

two cylindrical plug means in said bore, each one being adjacent a different one of said opposite ends, thereby defining respective upper and lower plug means;

screw thread means defined on said lower plug and on said bore for mutually threadable engagement of a circumferential portion of said lower plug means with a lower end adjacent circumferential portion of said bore whereby said lower plug means is selectively longitudinally positionable in said bore;

retaining means adjacent said upper end for fixedly positioning said upper plug means in said bore;

said upper and said lower plug means in said bore together defining an elongated cylindrical cavity which is discontinuous in a mid-region thereof where opposed respective inner end regions of said upper and said lower plug means are in longitudinally spaced relationship and thereby together define a circumferential medial channel;

said upper and said lower plug means defining in cooperate combination with said valve body:

(a) a central channel means that interconnects said medial channel with said main valve head chamber, and (b) peripheral channel means that (i) provides a medial circumferential chamber along the outside of each of said upper and said lower plug means and interconnects each of said medical chambers with adjacent portions of said cylindrical cavity, that (ii) interconnects each said medial chamber with the other thereof, and that (iii) interconnects both said medial chambers with a passageway which is defined in said valve body and which is associatable with a tank input gas conduit from said main valve assembly when said valve is associated with said tank;

seal means cooperating with said combination for isolating said central channel means from said peripheral channel means when said poppet means is in said valve closed position;

said poppet means being elongated and longitudinally slidably positioned in said cylindrical cavity for movement between an upper valve closed position and a lower valve open position, said poppet means having:

(a) an upper end and an opposite lower end, and external side walls,
(b) an upwardly projecting stem at said upper end that extends through and beyond said upper plug means and that is adapted for engagement with and movement by said diaphragm means,
(c) internal conduit means interconnecting a pair of opposite end adjacent portions of said poppet, each one of said opposite end adjacent portions defining with a radially adjacent said plug means a poppet chamber that is radially located in said cylindrical cavity and that is adjacent portions of said poppet side walls, whereby each said poppet chamber communicates with a different one of said medial chambers, and
(d) medial circumferentially and radially outwardly extending sidewall regions configured for making sealing engagement between said opposed respective inner end regions of said upper and said lower plug means when said poppet means is in said upper valve closed position, and including sealing means between said medial regions and said respective inner end regions in said upper valve closed position, and spring means and associated spring pin guidance means at said poppet lower end in said lower plug means for yieldingly biasing said poppet in said upper valve closed position, whereby, when said poppet means is in said upper valve closed position, said poppet chambers are each sealed from said medial channel, and, when said poppet means is in said lower valve open position, said poppet chambers communicate with said medial channel so that gas can pass from said head chamber to said passageway.

* * * * *